United States Patent
Catuogno et al.

(10) Patent No.: US 11,677,475 B2
(45) Date of Patent: Jun. 13, 2023

(54) ENCODING AND DECODING COMMUNICATIONS TRAFFIC IN A PULSE AMPLITUDE MODULATION FORMAT AND OPTICAL APPARATUS FOR SAME

(71) Applicant: Telefonaktiebolaget LM Ericsson (publ), Stockholm (SE)

(72) Inventors: Tommaso Catuogno, Pisa (IT); Enrico Forestieri, Pisa (IT); Luca Poti, Pisa (IT); Francesco Fresi, Pisa (IT); Fabio Cavaliere, Pisa (IT); Marco Secondini, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 57 days.

(21) Appl. No.: 17/603,247

(22) PCT Filed: Mar. 12, 2020

(86) PCT No.: PCT/EP2020/056598
§ 371 (c)(1),
(2) Date: Oct. 12, 2021

(87) PCT Pub. No.: WO2020/207691
PCT Pub. Date: Oct. 15, 2020

(65) Prior Publication Data
US 2022/0182150 A1 Jun. 9, 2022

Related U.S. Application Data

(60) Provisional application No. 62/833,115, filed on Apr. 12, 2019.

(51) Int. Cl.
*H04B 10/524* (2013.01)
*H04B 10/54* (2013.01)

(52) U.S. Cl.
CPC ......... *H04B 10/524* (2013.01); *H04B 10/541* (2013.01)

(58) Field of Classification Search
CPC .................. H04B 10/524; H04B 10/548–5561
See application file for complete search history.

(56) References Cited

U.S. PATENT DOCUMENTS

| | | | | | |
|---|---|---|---|---|---|
| 5,373,382 A | * | 12/1994 | Pirio | ................ | H04B 10/25137 385/27 |
| 6,097,525 A | * | 8/2000 | Ono | ..................... | H04B 10/505 398/186 |
| 2008/0019460 A1 | * | 1/2008 | Giles | ..................... | H04L 27/362 375/329 |

FOREIGN PATENT DOCUMENTS

| EP | 0825733 A2 | 2/1998 |
|---|---|---|
| EP | 2047615 A2 | 4/2009 |

(Continued)

OTHER PUBLICATIONS

Antonelli, Cristian, et al., "Kramers-Kronig PAM Transceiver and Two-Sided Polarization-Multiplexed Kramers-Kronig Transceiver", Journal of Lightwave Technology, vol. 36, No. 2, Jan. 15, 2018, 468-475.

(Continued)

*Primary Examiner* — Nathan M Cors
(74) *Attorney, Agent, or Firm* — Murphy, Bilak & Homiller, PLLC

(57) ABSTRACT

A method (100) of encoding communications traffic bits onto an optical carrier signal in a pulse amplitude modulation, PAM, format. The method comprises: receiving (102) bits to be transmitted; receiving (104) an optical carrier signal comprising optical pulses having an amplitude and respective phases; performing (106) PAM of the optical pulses to encode at least one respective bit in one of a pre-set plurality of amplitudes of a said optical pulse; and perform- (Continued)

ing (108) phase modulation of the optical pulses to encode at least one further respective bit in a phase difference between a said optical pulse and a consecutive optical pulse.

18 Claims, 8 Drawing Sheets

(56) References Cited

FOREIGN PATENT DOCUMENTS

| WO | 02061984 A1 | 8/2002 |
|---|---|---|
| WO | 2008010935 A2 | 1/2008 |
| WO | 2018028784 A1 | 2/2018 |
| WO | 2020057752 A1 | 3/2020 |

OTHER PUBLICATIONS

Mecozzi, Antonio, et al., "Information Capacity of Direct Detection Optical Transmission Systems", Journal of Lightwave Technology, vol. 36, No. 3, Feb. 1, 2018, 689-694.

\* cited by examiner

Direct Detection Scheme
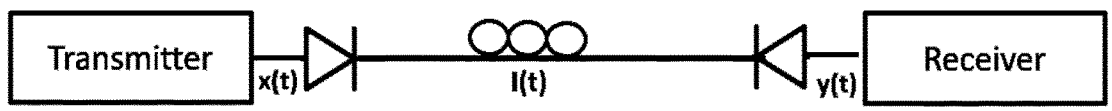
Coherent Detection Scheme
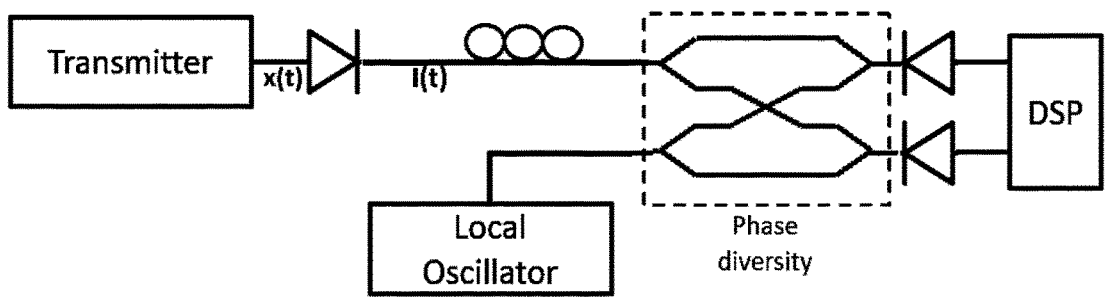
Fig. 1 – PRIOR ART
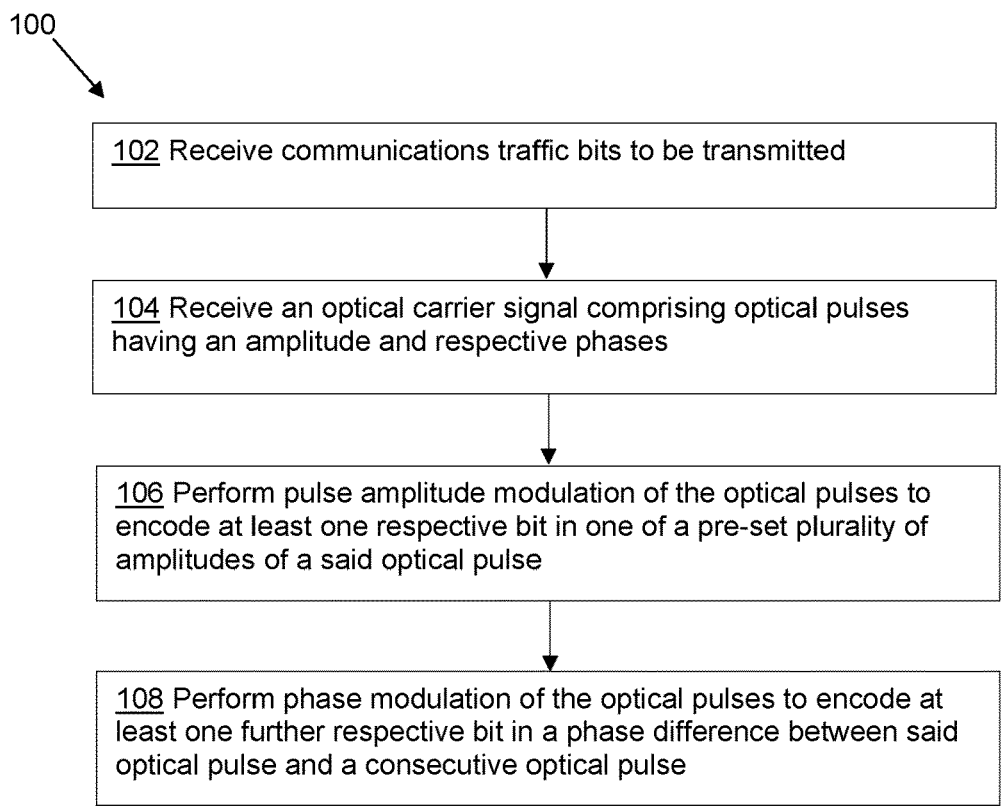
Fig. 2
ENCODING AND DECODING COMMUNICATIONS TRAFFIC IN A PULSE AMPLITUDE MODULATION FORMAT AND OPTICAL APPARATUS FOR SAME

TECHNICAL FIELD

The invention relates to a method of encoding communications traffic bits onto an optical carrier signal in a pulse amplitude modulation format and a method of decoding communications traffic bits carried on an optical carrier signal. The invention further relates to an optical transmitter and an optical receiver.

BACKGROUND

Direct detection, DD, techniques, as opposed to coherent detection techniques, embody the easiest form of optical detection scheme, as illustrated in FIG. 1, where the signal at the receiver is directly photoreceived without being further mixed with stronger optical signal and no specialized digital signal processing is required.

Although the advantages, in terms of achievable distance and capacity, are well known for coherent systems, the use of direct detection schemes is still preferred in applications, such as 5G transport and fronthaul network, where cost and simplicity of implementation are more relevant. In coherent systems, complex modulation schemes can be employed since the phase of the signal can be recovered at the receiver and used to store information. However, the complexity of the digital signal processing, DSP, and the cost of the additional optical/electrical components at the receiver represent a limit in several applications. The fundamental limitation of DD schemes as compared to coherent detection schemes is that the absolute phase of the optical signal cannot be exploited to carry information, limiting the modulation format to simple amplitude modulated schemes, such as on-off-keying, OOK, and M-level pulse amplitude modulation, M-PAM, thus reducing the theoretically achievable transmission capacity by a factor of two. This factor-two reduction is intuitively understandable if we consider that by discarding the phase of the signal in the complex plane, one out of two degrees of freedom is totally lost; however this has been formally disproved in A. Mecozzi and M. Shtaif, "*Information Capacity of Direct Detection Optical Transmission Systems*", Journal of Lightwave Technology, February 2018, where it has been theoretically proven that the capacity, C, of DD schemes as compared to coherent detection schemes, differs in the best case by only 1 bit of information. That is to say:

$$C_{coherent} - 1 \leq C_{dd} \leq C_{coherent}$$

The above theoretical results don't give much information about how those capacities may be achieved in practice and what modulation format has to be employed. Some work has been carried out in the direction of increasing the rate of DD schemes employing novel modulation techniques, as reported in Cristian Antonelli et al "*Kramers-Kronig PAM Transceiver and Two-Sided Polarization-Multiplexed Kramers-Kronig Transceiver*", Journal of Lightwave Technology, January 2018. Most of the proposed solutions are very promising but always tend to increase the complexity and cost of the standalone DD scheme, so compromising the main advantage of DD of being cheap and simple. Being able to increase the achievable rate in DD schemes, without increasing the complexity and cost of the systems is still an existing and valuable problem.

Coherent modulation formats, like dual-polarisation quadrature phase-shift keying, DP-QPSK, and dual-polarisation 16-quadrature amplitude modulation, DP-16QAM, enable high Bandwidth×Distance performance to be achieved, in the order of 100 Gbit/s×2000 km and 400 Gbit/s×700 km, respectively, on each dense wavelength division multiplexing, DWDM, channel. However, their cost is not expected to become lower than a few thousands of dollars, which is too high for fronthaul and 5G transport applications, like centralised-radio access network, C-RAN.

Direct detection modulation formats suffer from either receiver sensitivity penalty, in the case of 4-level and 8-level pulse amplitude modulation, PAM-4 and PAM-8, or poor tolerance to fiber chromatic dispersion, in the case of non-return to zero, NRZ.

SUMMARY

It is an object to provide an improved method of encoding communications traffic bits onto an optical carrier signal in a pulse amplitude modulation format. It is a further object to provide an improved a method of decoding communications traffic bits carried on an optical carrier signal. It is a further object to provide an improved optical transmitter. It is a further object to provide an improved optical receiver.

An aspect of the invention provides a method of encoding communications traffic bits onto an optical carrier signal in a pulse amplitude modulation format. The method comprises receiving communications traffic bits to be transmitted and receiving an optical carrier signal comprising optical pulses having an amplitude and respective phases. The method comprises performing pulse amplitude modulation of the optical pulses to encode at least one respective bit in one of a pre-set plurality of amplitudes of a said optical pulse. The method comprises performing phase modulation of the optical pulses to encode at least one further respective bit in a phase difference between a said optical pulse and a consecutive optical pulse.

The method enables encoding of an amount of information in the differential phase of consecutive pulses of the transmitted signal in addition to encoding information by pulse amplitude modulation and keep the complexity of the transmission as simple as in a DD scheme. The method enables 1 or more bits of additional information to be encoded in the differential phase of consecutive pulses of the transmitted signal. The method enables information to be transmitted in both the amplitude and phase of the signal, increasing the overall spectral efficiency of the communication, with negligible increases in term of cost and complexity.

The method leads to a significant increase of capacity as compared to PAM4 and may enable transmission with an acceptable sensitivity and chromatic dispersion penalty.

In an embodiment, the method comprises encoding a respective plurality of bits on a pre-set plurality, M, of amplitudes comprising positive and negative amplitudes of a plurality, M/2, of amplitude levels.

In an embodiment, the method comprises encoding a respective plurality, m=log$_2$ M−1, of bits on a pre-set plurality, M, of amplitudes.

In an embodiment, the method comprises encoding a respective plurality, N−1, of bits in a phase difference between a said optical pulse and the consecutive optical pulse. The optical pulses have one of a plurality, N, of phases as a result of the phase modulation. This enables encoding of an amount of information in the differential phase of consecutive pulses of the transmitted signal in addition to encoding information by pulse amplitude modulation. 1 or more bits of additional information may therefore be encoded in the differential phase of consecutive pulses of the transmitted signal.

In an embodiment, the optical pulses have one of two phases, 0 and π, as a result of the phase modulation. The phase modulation may be performed using a Mach Zehnder Modulator.

In an embodiment, the optical pulses are one of Root Raised Cosine, RRC, shaped pulses and Gaussian shaped pulses.

In an embodiment, the optical pulses are RRC filtered by a Bessel Thomson filter shaped pulses.

An aspect of the invention provides a method of decoding communications traffic bits carried on an optical carrier signal. The method comprises receiving an optical signal comprising optical pulses having respective amplitudes and respective phases, and having a symbol period, T. The method comprises directly detecting the optical pulses to generate a corresponding electrical received signal. The method comprises oversampling the electrical received signal at a rate of two samples per symbol period to obtain even samples indicative of respective amplitudes of the pulses and odd samples indicative of respective phase differences between consecutive pulses. The method comprises decoding the even samples to obtain at least one even bit for each even sample and decoding the odd samples to obtain at least one odd bit for each odd sample. The even bits and the odd bits are interleaved according to the respective samples.

The method enables decoding of an amount of information encoded in the differential phase of consecutive pulses of a received signal in addition to decoding information encoded as a pulse amplitude modulation of the received signal and keep the complexity of the transmission as simple as in a DD scheme. The method enables decoding of 1 or more bits of additional information encoded in the differential phase of consecutive pulses of the transmitted signal. The method enables information to be received in both the amplitude and phase of the signal, increasing the overall spectral efficiency of the communication, with negligible increases in term of cost and complexity.

In an embodiment, sampling the electrical received signal comprises sampling at times, kT, corresponding to the central instants of the optical pulses to obtain the even samples and sampling at times, $$kT + \frac{T}{2},$$

corresponding to maximum interference between consecutive pulses to obtain the odd samples.

In an embodiment, the odd samples are indicative of corresponding amplitudes of the electrical received signal and there is a direct correlation between the amplitude of the electrical received signal and the phase difference between the respective consecutive pulses.

In an embodiment, the odd samples amplitudes are proportional to the square modulus of the cosine phase difference between respective consecutive pulses.

Corresponding embodiments and advantages apply to the methods of decoding communications traffic bits described below.

An aspect of the invention provides a method of decoding communications traffic bits carried on an optical carrier signal. The method comprises receiving an optical signal comprising optical pulses having respective amplitudes and respective phases, and having a symbol period, T. The method comprises directly detecting the optical pulses to generate a corresponding electrical received signal. The method comprises oversampling the electrical received signal at a rate of two samples per symbol period to obtain odd samples indicative of respective amplitudes of the pulses and even samples indicative of respective phase differences between consecutive pulses. The method comprises decoding the even samples to obtain at least one even bit for each even sample and decoding the odd samples to obtain at least one odd bit for each odd sample. The even bits and the odd bits are interleaved according to the respective samples.

An aspect of the invention provides a method of decoding communications traffic bits carried on an optical carrier signal. The method comprises receiving an optical signal comprising optical pulses having respective amplitudes and respective phases, and having a symbol period, T. The method comprises directly detecting the optical pulses to generate a corresponding electrical received signal. The method comprises oversampling the electrical received signal at a rate of two samples per symbol period such that the electrical received signal is sampled at instants at which the amplitude of the electrical received signal is at a maximum and is sampled at instants corresponding to maximum interference between consecutive pulses. The method comprises decoding the samples to obtain at least one bit for each sample.

An aspect of the invention provides an optical transmitter comprising an optical source, an optical modulator and encoding apparatus. The optical source is arranged to generate an optical carrier signal comprising optical pulses having an amplitude and respective phases. The optical modulator is arranged to receive the optical pulses and is arranged to perform pulse amplitude modulation and phase modulation on the optical pulses. The encoding apparatus is arranged to receive communications traffic bits to be transmitted. The encoding apparatus is arranged to map at least one respective bit to one of a pre-set plurality of optical amplitudes. The encoding apparatus is arranged to map at least one further respective bit to a phase difference between consecutive optical pulses. The encoding apparatus is arranged to generate and transmit a respective drive signal to the optical modulator. The optical modulator, in response to the drive signal, being arranged to perform at least one of pulse amplitude modulation and phase modulation to thereby encode the bits onto respective optical pulses.

The transmitter enables encoding of an amount of information in the differential phase of consecutive pulses of the transmitted signal in addition to encoding information by pulse amplitude modulation and keep the complexity of the transmission as simple as in a DD scheme. The transmitter enables 1 or more bits of additional information to be encoded in the differential phase of consecutive pulses of the transmitted signal. The transmitter enables information to be transmitted in both the amplitude and phase of the signal, increasing the overall spectral efficiency of the communication, with negligible increases in term of cost and complexity.

In an embodiment, the encoding apparatus is arranged to map a respective plurality of bits to a pre-set plurality, M, of amplitudes comprising positive and negative amplitudes of a plurality, M/2, of amplitude levels.

In an embodiment, the encoding apparatus is arranged to map a respective plurality, $m=\log_2 M-1$, of bits on a pre-set plurality, M, of amplitudes.

In an embodiment, the optical modulator is arranged to phase modulate the optical pulses to have one of a plurality, N, of phases. The encoding apparatus is arranged to map a respective plurality, N−1, of bits in a respective phase difference between consecutive optical pulses. This enables encoding of an amount of information in the differential phase of consecutive pulses of the transmitted signal in addition to encoding information by pulse amplitude modulation. 1 or more bits of additional information may therefore be encoded in the differential phase of consecutive pulses of the transmitted signal.

In an embodiment, the optical modulator is arranged to phase modulate the optical pulses to have one of two phases, 0 and π. The optical modulator may be a Mach Zehnder Modulator.

In an embodiment, the optical pulses are one of Root Raised Cosine, RRC, shaped pulses and Gaussian shaped pulses.

In an embodiment, the optical pulses are RRC filtered by a Bessel Thomson filter shaped pulses.

An aspect of the invention provides an optical receiver comprising a photodetector, sampling apparatus and decoding apparatus. The photodetector is arranged to receive an optical signal comprising optical pulses having respective amplitudes and respective phases, and having a symbol period, T. The photodetector is arranged to directly detect the optical pulses to generate a corresponding electrical received signal. The sampling apparatus is arranged to oversample the electrical received signal at a rate of two samples per symbol period to obtain even samples indicative of respective amplitudes of the pulses and odd samples indicative of respective phase differences between consecutive pulses. The decoding apparatus is arranged to decode the even samples to obtain at least one even bit for each even sample and decode the odd samples to obtain at least one odd bit for each odd sample. The even bits and the odd bits are interleaved according to the respective samples.

The receiver enables decoding of an amount of information encoded in the differential phase of consecutive pulses of a received signal in addition to decoding information encoded as a pulse amplitude modulation of the received signal and keep the complexity of the transmission as simple as in a DD scheme. The receiver enables decoding of 1 or more bits of additional information encoded in the differential phase of consecutive pulses of the transmitted signal. The receiver enables information to be received in both the amplitude and phase of the signal, increasing the overall spectral efficiency of the communication, with negligible increases in term of cost and complexity.

In an embodiment, the sampling apparatus is arranged to sample the electrical received signal at times, kT, corresponding to the central instants of the optical pulses to obtain the even samples and at times, $$kT + \frac{T}{2},$$

corresponding to maximum interference between consecutive pulses to obtain the odd samples.

In an embodiment, the odd samples are indicative of corresponding amplitudes of the electrical received signal and there is a direct correlation between the amplitude of the electrical received signal and the phase difference between the respective consecutive pulses.

In an embodiment, the odd samples amplitudes are proportional to the square modulus of the cosine phase difference between respective consecutive pulses.

Corresponding embodiments and advantages apply equally to the optical receivers and optical transmission system described below.

An aspect of the invention provides an optical receiver comprising a photodetector, sampling apparatus and decoding apparatus. The photodetector is arranged to receive an optical signal comprising optical pulses having respective amplitudes and respective phases, and having a symbol period, T. The photodetector is arranged to directly detect the optical pulses to generate a corresponding electrical received signal. The sampling apparatus is arranged to oversample the electrical received signal at a rate of two samples per symbol period to obtain odd samples indicative of respective amplitudes of the pulses and even samples indicative of respective phase differences between consecutive pulses. The decoding apparatus is arranged to decode the even samples to obtain at least one even bit for each even sample and decode the odd samples to obtain at least one odd bit for each odd sample. The even bits and the odd bits are interleaved according to the respective samples.

An aspect of the invention provides an optical receiver comprising a photodetector, sampling apparatus and decoding apparatus. The photodetector is arranged to receive an optical signal comprising optical pulses having respective amplitudes and respective phases, and having a symbol period, T. The photodetector is arranged to directly detect the optical pulses to generate a corresponding electrical received signal. The sampling apparatus is arranged to oversample the electrical received signal at a rate of two samples per symbol period such that the electrical received signal is sampled at instants at which the amplitude of the electrical received signal is at a maximum and is sampled at instants corresponding to maximum interference between consecutive pulses. The decoding apparatus is arranged to decode the samples to obtain at least one bit for each sample.

An aspect of the invention provides an optical transmission system comprising an optical transmitter, an optical receiver and an optical link connecting the optical transmitter and the optical receiver. The optical transmitter comprises an optical source, an optical modulator and encoding apparatus. The optical source is arranged to generate an optical carrier signal comprising optical pulses having an amplitude and respective phases. The optical modulator is arranged to receive the optical pulses and is arranged to perform pulse amplitude modulation and phase modulation on the optical pulses. The encoding apparatus is arranged to receive communications traffic bits to be transmitted. The encoding apparatus is arranged to map at least one respective bit to one of a pre-set plurality of optical amplitudes. The encoding apparatus is arranged to map at least one further respective bit to a phase difference between consecutive optical pulses. The encoding apparatus is arranged to generate and transmit a respective drive signal to the optical modulator. The optical modulator, in response to the drive signal, being arranged to perform at least one of pulse amplitude modulation and phase modulation to thereby encode the bits onto respective optical pulses. The optical receiver comprises a photodetector, sampling apparatus and decoding apparatus. The photodetector is arranged to receive an optical signal comprising optical pulses having respective amplitudes and respective phases, and having a symbol period, T. The photodetector is arranged to directly detect the optical pulses to generate a corresponding electrical received signal. The sampling apparatus is arranged to oversample the electrical received signal at a rate of two samples per symbol period to obtain even samples indicative of respective amplitudes of the pulses and odd samples indicative of respective phase differences between consecutive pulses. The decoding apparatus is arranged to decode the even samples to obtain at least one even bit for each even sample and decode the odd samples to obtain at least one odd bit for each odd sample. The even bits and the odd bits are interleaved according to the respective samples.

An aspect of the invention provides an optical transmission system comprising any of the above optical transmitters, any of the above optical receivers and an optical link connecting said optical transmitter and said optical receiver.

Embodiments of the invention will now be described, by way of example only, with reference to the accompanying drawings.

BRIEF DESCRIPTION OF THE DRAWINGS

FIG. 1 illustrates prior art direct detection and coherent detection schemes;
FIG. 2 is a flowchart illustrating an embodiment of method steps.

DETAILED DESCRIPTION

Figure 3:
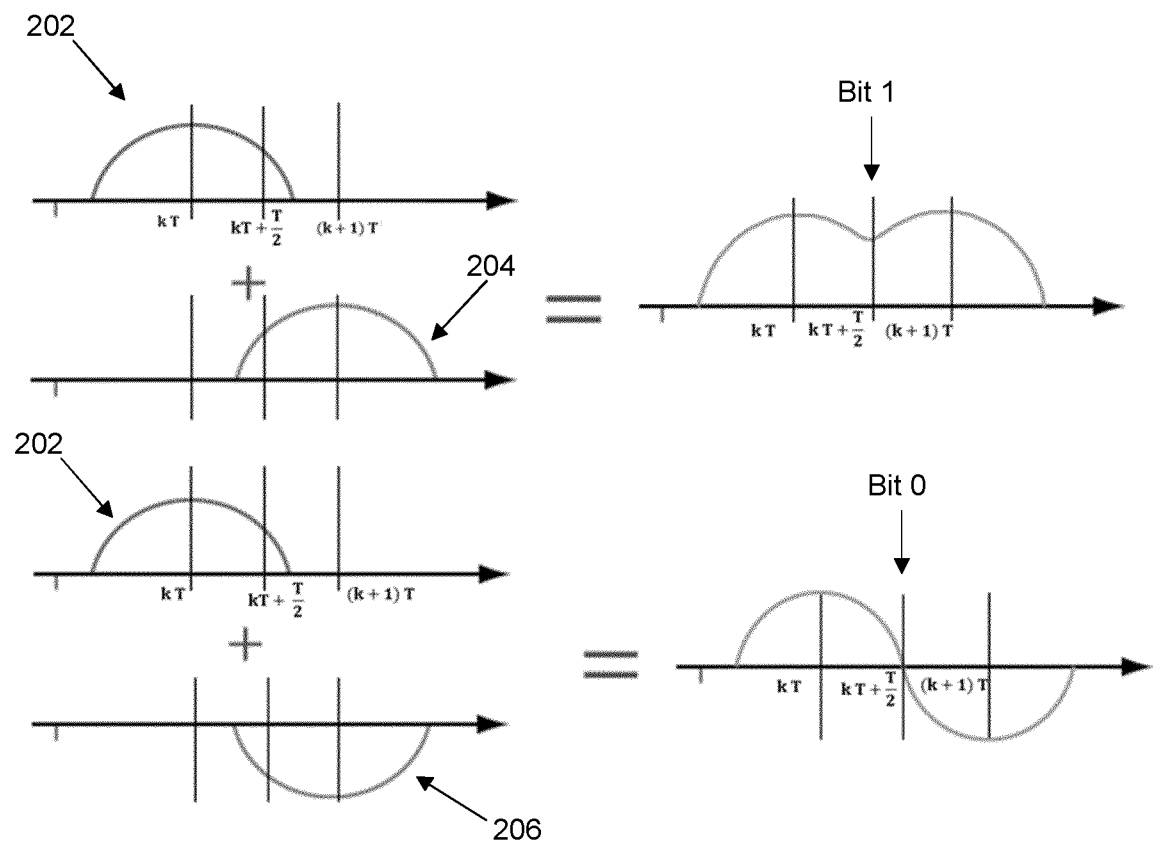
FIG. 3 illustrates the intersymbol modulation of the method of FIG. 2.

The limitation of DD systems is due to the photodiode, a device producing an output proportional to the square of the input electric field; in this context, optical power. Due to such devices any information related to the absolute phase of the signal is lost, since only the square modulus of the signal is detected, limiting the set of usable modulation format to the class of amplitude modulation schemes.

The present application describes methods and apparatus that lead to a significant increase of capacity as compared to PAM4 and have an acceptable sensitivity and chromatic dispersion penalty.

The present invention provides a direct detection transmission system capable to encode an amount of information in the phase difference between consecutive optical pulses of the signal in addition to encoding information by pulse amplitude modulation. The system is capable of encoding information in both the phase and amplitude of the signal and keeping the complexity of the receiver/transmitter as simple as in a DD scheme.

The methods and apparatus of the present invention enable 1 or more bits of additional information to be encoded in the differential phase of consecutive optical pulses of the signal per symbol.

The present invention provides a direct detection system using a square law detector such as a photodiode, where the information is encoded not only in the amplitude of the signals, as in most of the known DD systems, but also in the differential phase of consecutive pulses of the transmitted signal. A receiver oversamples the signal, taking 2 samples per symbol period. The receiver alternately samples the signal at instants where the signal amplitude is maximum and at instants corresponding to the cross-point of consecutive pulses, i.e. instants of maximum interference between consecutive pulses, to detect their phase difference. Two sets of samples are thus obtained. For example, a first, EVEN, sample is taken at a time in the symbol period corresponding to the maximum of transmitted amplitude of a pulse (symbol), and a second, ODD, sample is taken at a time in the symbol period at which the interference between one pulse (symbol) and the consecutive pulse is at a maximum, i.e. between two pulses, at an 'intersymbol'. The two sets, odd and even, of samples are processed independently at the receiver. The amplitude information, contained in, for example, the even samples is processed as in a regular optical receiver using a threshold detector as is known for PAM. The phase information, contained in, for example, the odd samples $y_{2k+1}$ is received using a static threshold detector, since the detected amplitude of the intersymbol is directly proportional to the cosine of the phase difference of the consecutive pulses.

The present invention provides a modulation scheme able to convey information in both the amplitude and phase of the signal, increasing the overall spectral efficiency of the communication, with negligible increases in term of cost and complexity.

The same reference numbers will used for corresponding features in different embodiments.

Referring to FIG. 2, an embodiment provides a method 100 of encoding communications traffic bits onto an optical carrier signal in a pulse amplitude modulation format.

The method begins at step 102 with receiving communications traffic bits to be transmitted. At step 104, an optical carrier signal comprising optical pulses is received, the optical pulses having an amplitude and respective phases. At step 106, pulse amplitude modulation of the optical pulses is performed to encode at least one respective bit in one of a pre-set plurality of amplitudes of a said optical pulse. And, at step 108, phase modulation of the optical pulses is performed to encode at least one further respective bit in a phase difference between said optical pulse and a consecutive optical pulse.

In an embodiment, the method comprises encoding a respective plurality of bits on a pre-set plurality, M, of amplitudes comprising positive and negative amplitudes of a plurality, M/2, of amplitude levels.

In an embodiment, the method comprises encoding a respective plurality, $m=\log_2 M-1$, of bits on a pre-set plurality, M, of amplitudes.

In an embodiment, the method comprises encoding a respective plurality, N-1, of bits in a phase difference between a said optical pulse and the consecutive optical pulse. The optical pulses have one of a plurality, N, of phases as a result of the phase modulation.

In an embodiment, the optical pulses have one of two phases, 0 and $\pi$, as a result of the phase modulation. The phase modulation may be performed using a Mach Zehnder Modulator.

In an embodiment, the optical pulses are Root Raised Cosine, RRC, shaped pulses, which may be RRC filtered by a Bessel Thomson filter. Alternatively, the optical pulses may be Gaussian shaped pulses.

FIG. 3 illustrates the differential encoding of a bit in the phase difference (the "intersymbol") between consecutive pulses (the shape of the pulses is not relevant in the Figure). This encoding can be interpreted in the complex plane as follows: each pulse is generated with one of two phases, $\phi=\{0, \pi\}$, and given two consecutive symbols (pulses), $x_k$ and $x_{k+1}$, with phases $\phi_k$ and $\phi_{k+1}$, an odd sample taken between consecutive pulses will output after the square law detector (the photodiode), a signal that is proportional to $|\cos(\phi_k-\phi_{k-1})|^2$ Therefore, a total of $m=\log_2$ (M−1 in amplitude, 1 in phase) bits may be encoded on the optical pulses, exactly as in a conventional bipolar M-PAM, with the difference that one bit (the sign bit) is differentially encoded.

The differential encoding illustrated in FIG. 3 adopts two phases $\phi=\{0, \pi\}$ for the symbols (pulses). However, since the intersymbol's amplitude is proportional to the square modulus of the cosine phase difference between the two consecutive pulses, more complex modulations can be constructed, where more bits of information are encoded in the phase difference between consecutive pulses.

The intersymbol modulation may be more formally treated as follows:

We assume that we have a linearly modulated signal with a complex envelope $$x(t) = \sum_{i=-\infty}^{\infty} x_i p(t-kT)$$

where p(t) is the base pulse with Fourier transform P(f), T the symbol time, and x_i a symbol drawn from a given modulation alphabet. The signal is corrupted by ASE noise with power spectral density (PSD) $N_0$, filtered by an optical filter with low-pass equivalent response h(t), and photodetected.

Assuming an ideal noiseless photodetector with no bandwidth limitations, the photodetected signal can be expressed as $$y(t)=|[x(t)+w(t)]|^2 \otimes h(t)$$

where w(t) is additive white Gaussian noise (AWGN). The photodetected signal is then sampled at twice the symbol rate to obtain a sequence of even and odd samples, respectively expressed as:

$$y_{2k} = y(kT) = \left| \sum_{i=-\infty}^{\infty} x_i f_{2(k-i)} + n_{2k} \right|^2$$

$$y_{2k+1} = y\left(kT + \frac{T}{2}\right) = \left| \sum_{i=-\infty}^{\infty} x_i f_{2(k-i)+1} + n_{2k+1} \right|^2$$

In order to simplify the analysis, we assume that the overall channel response f(t) satisfies the Nyquist criterion and, in addition, that any intersymbol interference, ISI, caused by f(t) on the odd samples is limited to the pair of adjacent symbols. Therefore, given $$f_k = f\left(k\frac{T}{2}\right),$$

all the channel coefficients $f_k$ vanish for $|k|>1$ and the even and odd samples can be rewritten as:

$$y_{2k} = |f_0|^2 |x_k| + 2\Re\{f_0 x_k n_{2k}^*\} + |n_{2k}|^2$$

$$y_{2k+1} = |f_1 y_k + f_{-1} x_{k+1} + n_{2k+1}|^2 = $$
$$|f_1|^2 |x_k|^2 + |f_{-1}|^2 |x_{k+1}|^2 + 2|f_1||f_{-1}||x_k||x_{k+1}|\cos(\Delta\phi_k - \theta) + \varsigma_k$$

where $\Delta\phi_k$ is the phase difference between the symbols $x_k$ and $x_{k+1}$, $\theta$ the phase difference between the coefficients $f_1$ and $f_2$ and $\varsigma_k = 2\Re\{(f_1 x_k + f_{-1} x_{k+1}) n_{2k+1}^*\} + |n_{2k+1}|^2$.

Finally, we can determine the auxiliary decision variable $z_k$ that will be used by the detector to decode the phase information $$z_k = y_{2k+1} - c_1 y_{2k} - c_{-1} y_{2k+2}$$

where $c_1, c_{-1}$ are two coefficients defined as:

$$c_{\pm 1} = \frac{|f_{\pm 1}|^2}{|f_0|^2}$$

Expanding $z_k$ it is possible to appreciate the correlation with the phase difference of the symbols. Given that, it's possible to define an amplitude threshold value that can be used to distinguish the differential phase of consecutive symbols.

The set of even and odd symbols are then received independently with a threshold detector, using different threshold variable to identify the amplitude information in the even symbols, and the differential phase information in the odd symbols.

Figure 4:
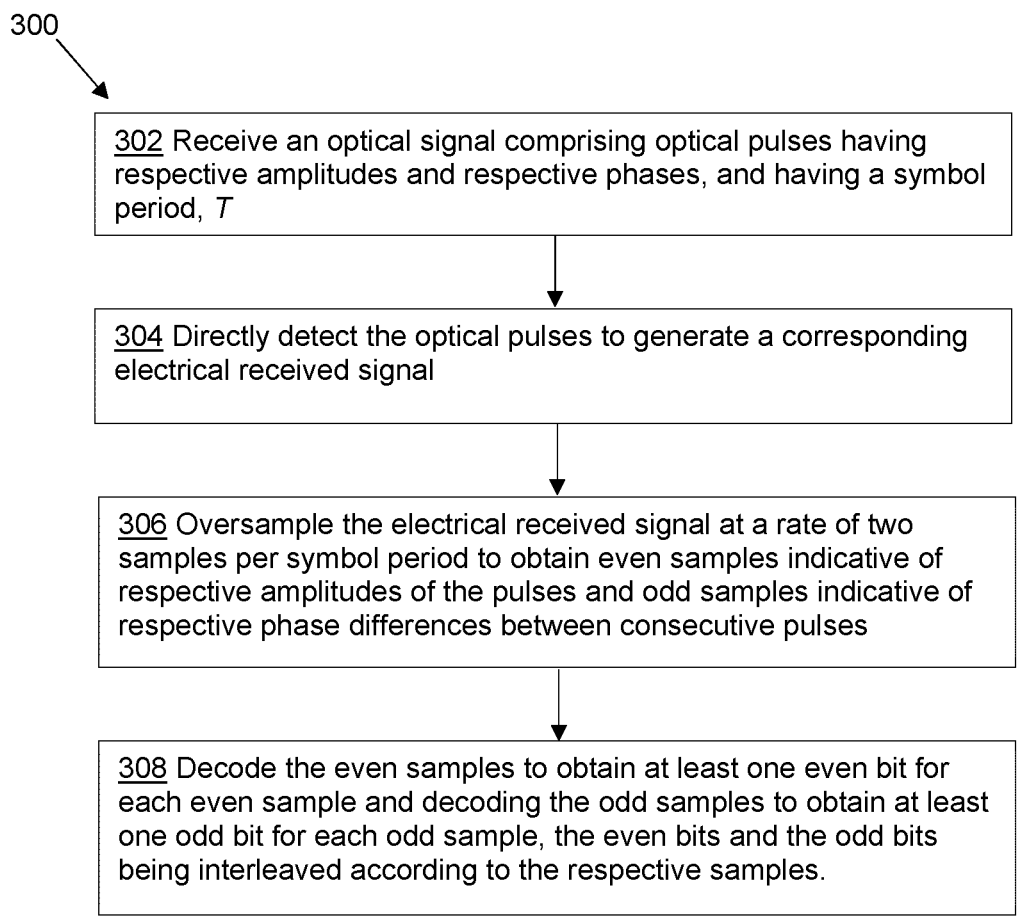
FIGS. 4 to 6 are flowcharts illustrating embodiments of method steps.

Referring to FIG. 4, an embodiment provides a method 300 of decoding communications traffic bits carried on an optical carrier signal.

The method begins at step 302 with receiving an optical signal comprising optical pulses having respective amplitudes and respective phases, and having a symbol period, T. At step 304, the optical pulses are directly detected to generate a corresponding electrical received signal. At step 306, the electrical received signal is oversampled at a rate of two samples per symbol period to obtain even samples indicative of respective amplitudes of the pulses and odd samples indicative of respective phase differences between consecutive pulses. At step 308, the even samples are decoded to obtain at least one even bit for each even sample and the odd samples are decoded to obtain at least one odd bit for each odd sample, the even bits and the odd bits being interleaved according to the respective samples.

In an embodiment, sampling the electrical received signal comprises sampling at times, kT, corresponding to the central instants of the optical pulses to obtain the even samples and sampling at times, $$kT + \frac{T}{2},$$

corresponding to maximum interference between consecutive pulses to obtain the odd samples.

In an embodiment, the odd samples are indicative of corresponding amplitudes of the electrical received signal. There is a direct correlation between the amplitude of the electrical received signal and the phase difference between the respective consecutive pulses.

In an embodiment, the odd samples amplitudes are proportional to the square modulus of the cosine phase difference between respective consecutive pulses.

Figure 5:
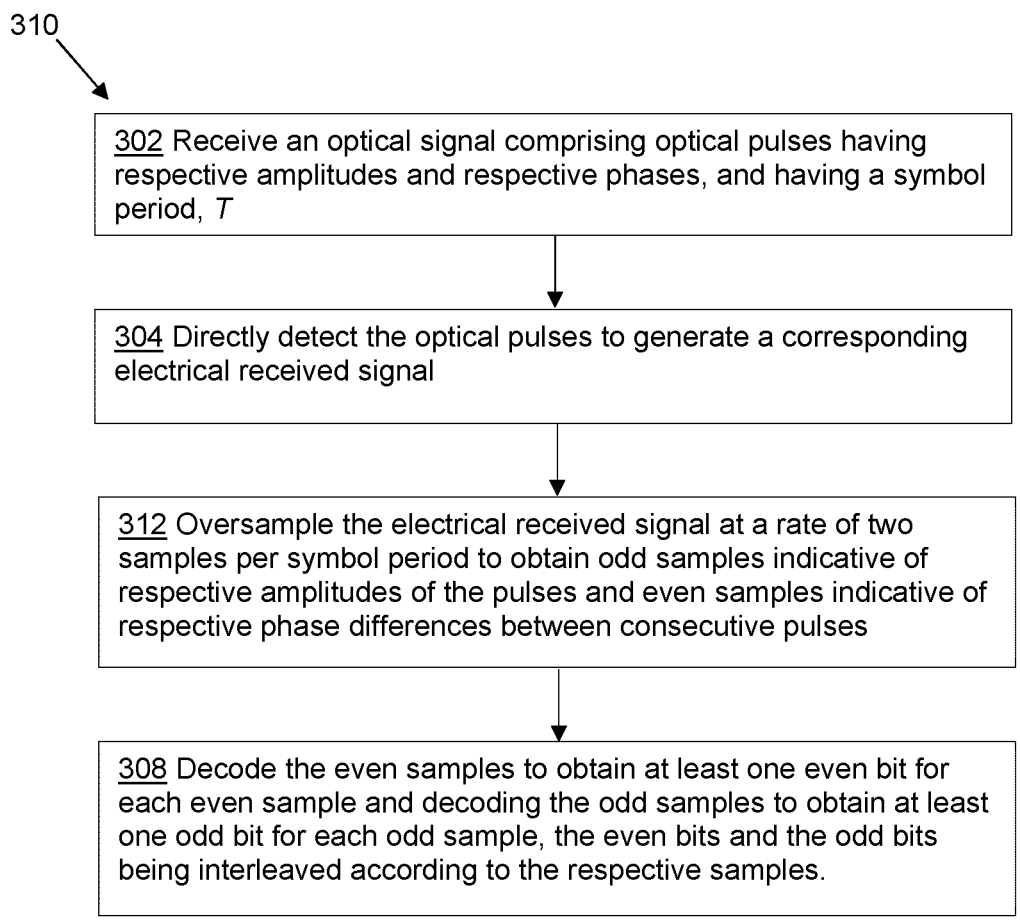

Referring to FIG. 5, an embodiment provides a method 310 of decoding communications traffic bits carried on an optical carrier signal. In this embodiment, at step 312, the electrical received signal is oversampled at a rate of two samples per symbol period to obtain odd samples indicative of respective amplitudes of the pulses and even samples indicative of respective phase differences between consecutive pulses.

In an embodiment, sampling the electrical received signal comprises sampling at times, kT, corresponding to the central instants of the optical pulses to obtain the odd samples and sampling at times, $$kT + \frac{T}{2},$$

corresponding to maximum interference between consecutive pulses to obtain the even samples.

In an embodiment, the even samples are indicative of corresponding amplitudes of the electrical received signal. There is a direct correlation between the amplitude of the electrical received signal and the phase difference between the respective consecutive pulses.

In an embodiment, the even samples amplitudes are proportional to the square modulus of the cosine phase difference between respective consecutive pulses.

Figure 6:
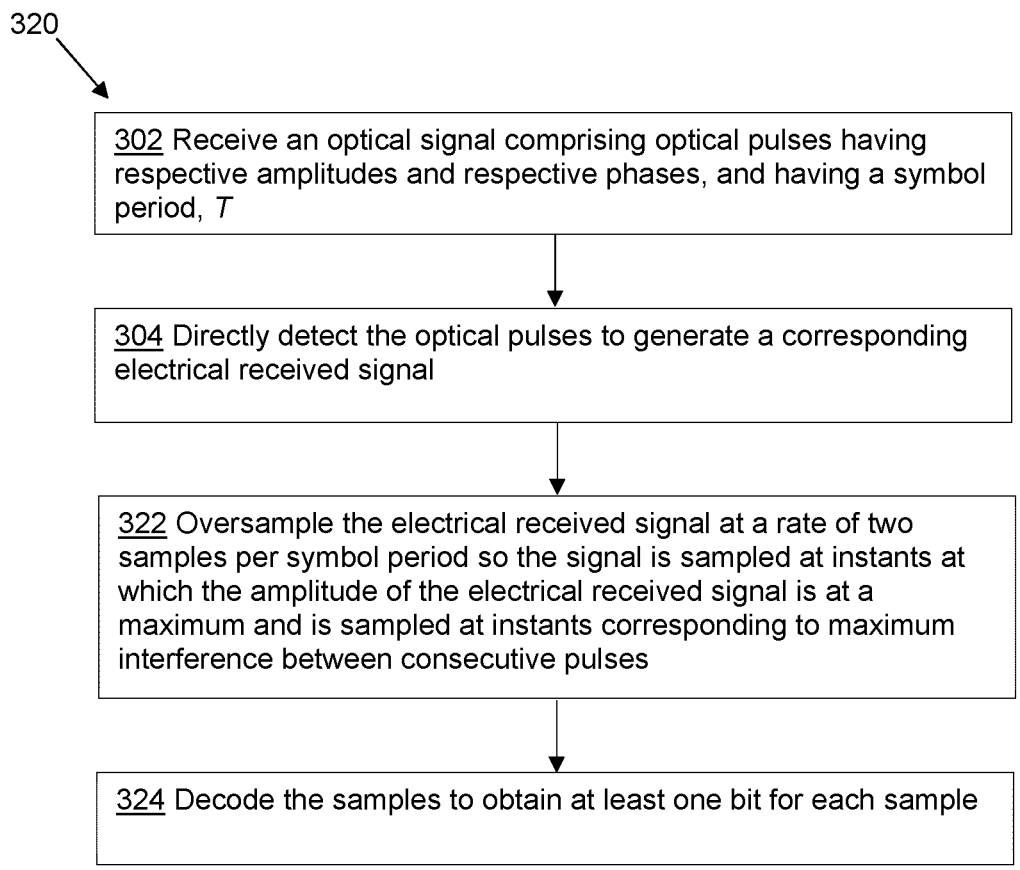

Referring to FIG. 6, an embodiment provides a method 320 of decoding communications traffic bits carried on an optical carrier signal. In this embodiment, at step 322, the electrical received signal is oversampled at a rate of two samples per symbol period so the signal is sampled at instants at which the amplitude of the electrical received signal is at a maximum and is sampled at instants corresponding to maximum interference between consecutive pulses. At step 324, the samples are decoded to obtain at least one bit for each sample.

In an embodiment, sampling the electrical received signal comprises sampling at times, kT, corresponding to the central instants of the optical pulses to obtain a first set of samples and sampling at times, $$kT + \frac{T}{2},$$

corresponding to maximum interference between consecutive pulses to obtain a second set of samples.

In an embodiment, the samples of the second set are indicative of corresponding amplitudes of the electrical received signal. There is a direct correlation between the amplitude of the electrical received signal and the phase difference between the respective consecutive pulses.

In an embodiment, the amplitudes of the samples of the second set are proportional to the square modulus of the cosine phase difference between respective consecutive pulses.

Figure 7:
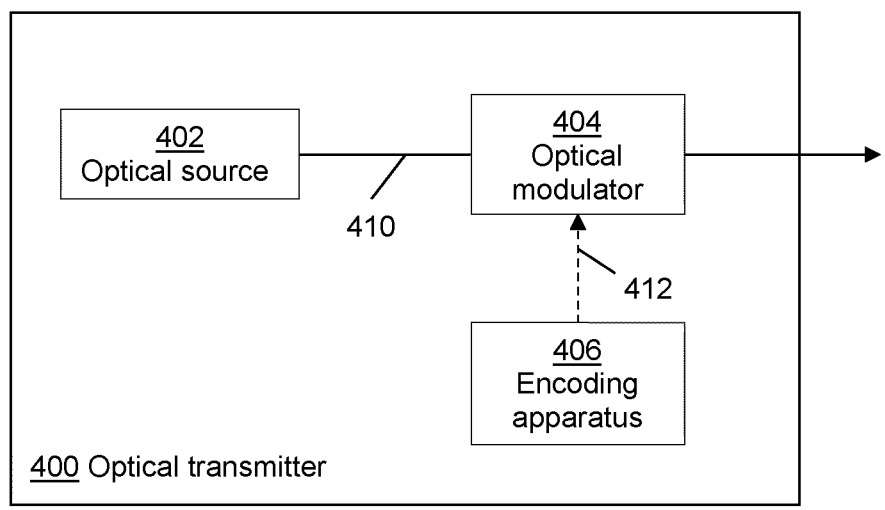
FIG. 7 is a block diagram illustrating an embodiment of an optical transmitter.

Referring to FIG. 7, an embodiment provides an optical transmitter 400 comprising an optical source 402, an optical modulator 404 and encoding apparatus 406. The optical source is arranged to generate an optical carrier signal comprising optical pulses having an amplitude and respective phases. The optical modulator 404 is arranged to receive the optical pulses. In one embodiment the optical modulator may be arranged to perform pulse amplitude modulation and phase modulation on the optical pulses. In an alternative embodiment the pulse amplitude modulation and phase modulation on the optical pulses may be performed by two optical modulators. The encoding apparatus is arranged to receive communications traffic bits to be transmitted. The encoding apparatus is arranged to map at least one respective bit to one of a pre-set plurality of optical amplitudes. The encoding apparatus is additionally arranged to map at least one further respective bit to a phase difference between consecutive optical pulses. The encoding apparatus is additionally arranged to generate and transmit a respective drive signal to the optical modulator. The optical modulator, in response to the drive signal, being arranged to perform at least one of pulse amplitude modulation and phase modulation to thereby encode the bits onto respective optical pulses.

In an embodiment, the encoding apparatus is arranged to map a respective plurality of bits to a pre-set plurality, M, of amplitudes comprising positive and negative amplitudes of a plurality, M/2, of amplitude levels.

In an embodiment, the encoding apparatus is arranged to map a respective plurality, $m=\log_2 M-1$, of bits on a pre-set plurality, M, of amplitudes.

In an embodiment, the optical modulator is arranged to phase modulate the optical pulses to have one of a plurality, N, of phases. The encoding apparatus is arranged to map a respective plurality, N−1, of bits in a respective phase difference between consecutive optical pulses.

In an embodiment, the optical modulator is arranged to phase modulate the optical pulses to have one of two phases, 0 and π. The optical modulator may be a Mach Zehnder Modulator.

In an embodiment, the optical pulses are Root Raised Cosine, RRC. shaped pulses which may be RRC filtered by a Bessel Thomson filter. Alternatively, the optical pulses may be Gaussian shaped pulses.

Figure 8:
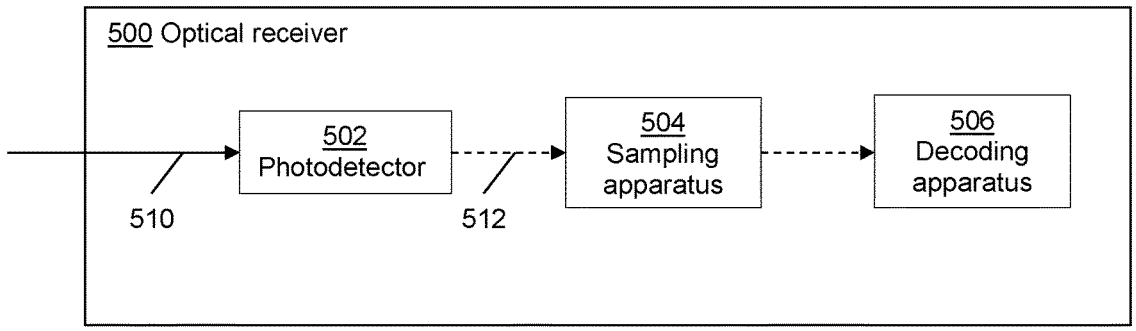
FIGS. 8 and 9 are block diagrams illustrating embodiments of an optical receiver.

Referring to FIG. 8 an embodiment provides optical receiver 500 comprising a photodetector 502, sampling apparatus 504 and decoding apparatus 506. The photodetector is arranged to receive an optical signal comprising optical pulses having respective amplitudes and respective phases, and having a symbol period, T. The photodetector is further arranged to directly detect the optical pulses to generate a corresponding electrical received signal. The sampling apparatus 504 is arranged to oversample the electrical received signal at a rate of two samples per symbol period to obtain even samples indicative of respective amplitudes of the pulses and odd samples indicative of respective phase differences between consecutive pulses. The decoding apparatus 506 is arranged to decode the even samples to obtain at least one even bit for each even sample and decode the odd samples to obtain at least one odd bit for each odd sample. The even bits and the odd bits are interleaved according to the respective samples.

In an embodiment, the sampling apparatus is arranged to sample the electrical received signal at times, kT, corresponding to the central instants of the optical pulses to obtain the even samples and at times, $$kT + \frac{T}{2},$$

corresponding to maximum interference between consecutive pulses to obtain the odd samples.

In an embodiment, the odd samples are indicative of corresponding amplitudes of the electrical received signal and there is a direct correlation between the amplitude of the electrical received signal and the phase difference between the respective consecutive pulses.

In an embodiment, the odd samples amplitudes are proportional to the square modulus of the cosine phase difference between respective consecutive pulses.

In an embodiment, the sampling apparatus 504 is arranged to oversample the electrical received signal at a rate of two samples per symbol period to obtain odd samples indicative of respective amplitudes of the pulses and even samples indicative of respective phase differences between consecutive pulses.

In an embodiment, the sampling apparatus is arranged to sample the electrical received signal at times, kT, corresponding to the central instants of the optical pulses to obtain the odd samples and at times, $$kT + \frac{T}{2},$$

corresponding to maximum interference between consecutive pulses to obtain the even samples.

In an embodiment, the even samples are indicative of corresponding amplitudes of the electrical received signal and there is a direct correlation between the amplitude of the electrical received signal and the phase difference between the respective consecutive pulses.

In an embodiment, the even samples amplitudes are proportional to the square modulus of the cosine phase difference between respective consecutive pulses.

In an embodiment, the sampling apparatus 504 is arranged to oversample the electrical received signal at a rate of two samples per symbol period such that the electrical received signal is sampled at instants at which the amplitude of the electrical received signal is at a maximum and is sampled at instants corresponding to maximum interference between consecutive pulses. The decoding apparatus 506 is arranged to decode the samples to obtain at least one bit for each sample.

In an embodiment, the sampling apparatus 504 is arranged to sample the electrical received signal at times, kT, corresponding to the central instants of the optical pulses to obtain a first set of samples and to sample the received signal at times, $$kT + \frac{T}{2},$$

corresponding to maximum interference between consecutive pulses to obtain a second set of samples.

In an embodiment, the samples of the second set are indicative of corresponding amplitudes of the electrical received signal. There is a direct correlation between the amplitude of the electrical received signal and the phase difference between the respective consecutive pulses.

In an embodiment, the amplitudes of the samples of the second set are proportional to the square modulus of the cosine phase difference between respective consecutive pulses.

Figure 9:
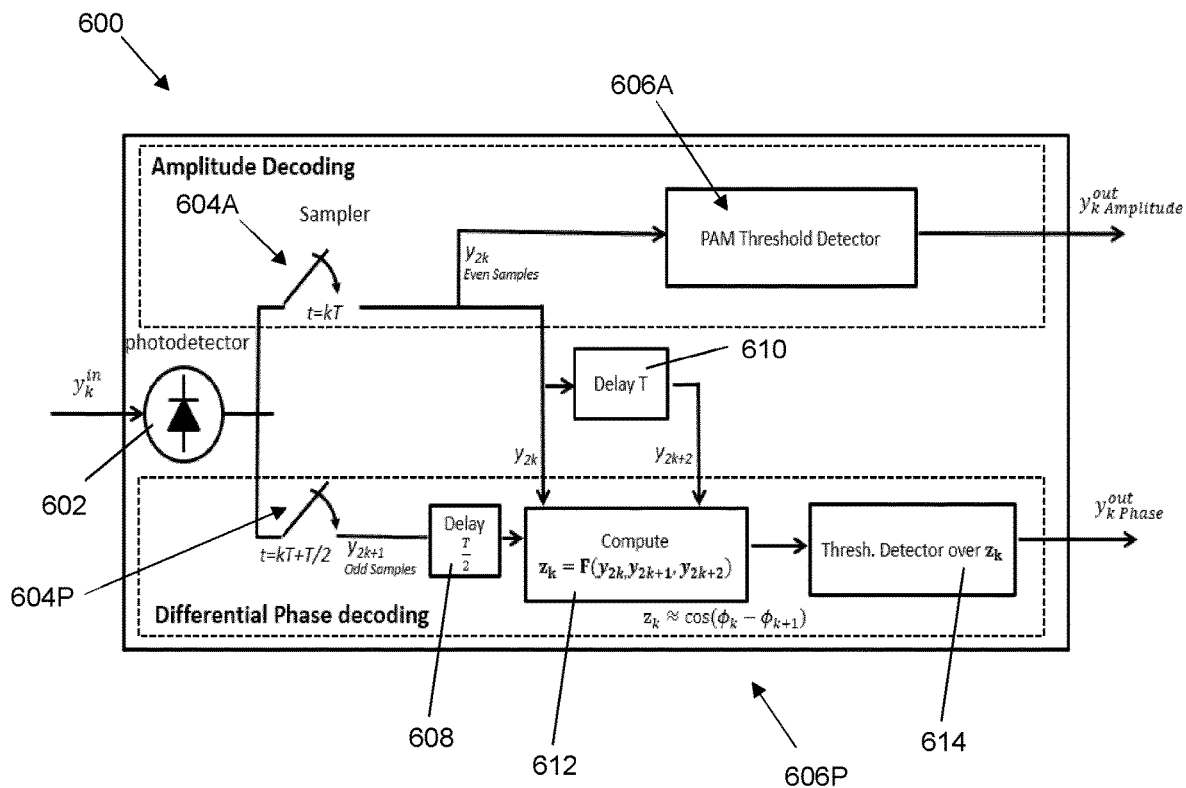

Referring to FIG. 9, an embodiment provides an optical receiver 600 comprising a photodetector 602, sampling apparatus 604 and decoding apparatus 606.

In this embodiment, the sampling apparatus comprises a first sampler 604A and a second sampler 604P. The first sampler is arranged to sample the electrical received signal at a rate of one sample per symbol period, T, at times (kT), to obtain even samples, $y_{2k}$, indicative of respective amplitudes of the pulses. The second sampler is arranged to sample the electrical received signal at a rate of one sample per symbol period, T, at times $$\left(kT + \frac{T}{2}\right),$$

to obtain odd samples, $y_{2k+1}$, indicative of respective phase differences between consecutive pulses.

The optical receiver therefore comprises two samplers: one sampling with period T (the symbol period) for the even samples; and an additional sampler, sampling with period T (the same used for the even samples) but shifted of a time T/2, for the odd samples, where the phase information is modulated. This oversampling can be implemented by adding a parallel sampler at the receiver sampling at the same rate as the DD one used to detect the amplitudes of the symbols. The even samples are decoded using an amplitude threshold detector optimized over the levels of power expected for the pulses, and the odd samples are decoded using an amplitude threshold detector optimized over the levels of power expected for the interference of consecutive pulses, i.e. the intersymbol levels.

The decoding apparatus 606 is arranged to decode the even samples to obtain at least one even bit for each even sample and decoding the odd samples to obtain at least one odd bit for each odd sample, the even bits and the odd bits being interleaved according to the respective samples. The decoding apparatus comprises amplitude decoding apparatus 606A and phase decoding apparatus 606P.

The amplitude decoding apparatus comprises a PAM threshold detector arranged to decode the amplitude levels of the even samples into a corresponding one or more even bits.

The phase decoding apparatus comprises a first delay line 610, a second delay line 608, an intersymbol estimator 612 and a threshold detector 614. The first delay line is arranged to receive replicas of the even samples and to apply a delay, T, to the even samples replicas, to generate delayed even samples, $y_{2k+2}$. The second delay line is arranged to receive the odd samples and apply a delay, T/2, to the odd samples. The intersymbol estimator is arranged to receive the odd samples, the even samples and the delayed replica even samples and is arranged to estimate symbols by computing $z_k = F(y_{2k}, y_{2k+1}, y_{2k+2})$; the full expanded formula is detailed in the Appendix. The threshold detector is arranged to apply a threshold to the estimated symbols, to convert the estimated symbols into one or more odd bits.

The encoding apparatus, sampling apparatus and decoding apparatus may be provided as processing circuitry comprising a combination of one or more of a microprocessor, controller, microcontroller, central processing unit, digital signal processor, application-specific integrated circuit, field programmable gate array, or any other suitable computing device, resource, or combination of hardware, device readable medium, the apparatus functionality. For example, processing circuitry may execute instructions stored in a device readable medium or in memory within the processing circuitry. Such functionality may include providing any of the various features, functions, or benefits discussed herein. In some embodiments, processing circuitry may include a system on a chip (SOC).

In certain embodiments, some or all of the functionality described herein as being provided by the encoding apparatus, sampling apparatus and decoding apparatus may be performed by processing circuitry executing instructions stored on a device readable medium or memory within the processing circuitry. In alternative embodiments, some or all of the functionality may be provided by processing circuitry without executing instructions stored on a separate or discrete device readable medium, such as in a hard-wired manner. In any of those embodiments, whether executing instructions stored on a device readable storage medium or not, processing circuitry can be configured to perform the described functionality.

Figure 10:
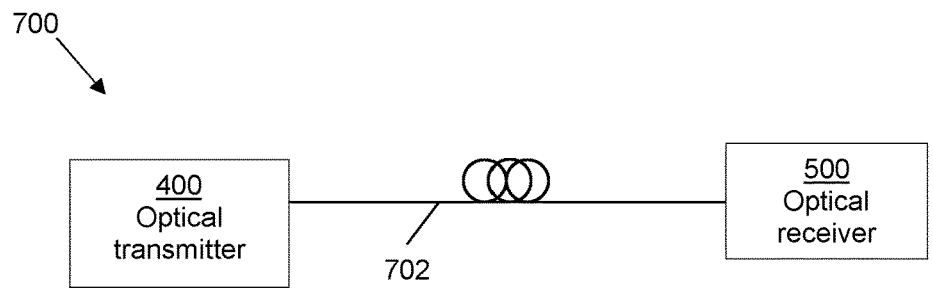
FIG. 10 is a block diagram illustrating an embodiment of an optical transmission system.

Referring to FIG. 10, an embodiment provides an optical transmission system 700 comprising an optical transmitter 400, as described above with reference to FIG. 7, an optical receiver 500, as described above with reference to FIG. 8, and an optical link 702 connecting the optical transmitter and the optical receiver.

The modulation scheme of the present invention is based on a standard bipolar M-PAM (positive and negative amplitude symbols), with M/2 amplitude levels, modulating $m=\log_2 M-1$ bits on amplitudes $\{\pm A_1, \pm A_2, \ldots, \pm A_{M/2}\}$.

Bi-polar M-PAM modulation used in combination with a DD scheme, as illustrated in FIG. 1, is not able to carry the maximum theoretical about of information, bits, related to the number of amplitude levels, i.e. $m=\log_2 M$, since one degree of freedom, the phase (i.e. the ±sign), is discarded at the receiver by the square law detector. Unipolar PAM is indeed more common, where the amplitude levels used are all positive and the phase degree of freedom is not used. With current receivers, bipolar PAM still has some advantage, since the negative amplitudes of the modulation symbols decrease the required bandwidth and increase the energy distance between symbols, increasing the robustness of the modulation scheme, but sacrificing one bit/symbol of capacity. Indeed, negative and positive symbols with equal amplitude cannot be discriminated by a regular photodiode followed by decision thresholds.

In the present invention, in order to also exploit the phase of the signal to encode information bits, at the optical receiver the sampling rate and number of samples of the received signal is doubled as compared to M-PAM. The receiver therefore samples the received signal both in the points where usually amplitude information is decoded (i.e. at the central instant of each pulse) and in between consecutive symbols (i.e. pulses), where the interference between consecutive pulses (intersymbol) is maximum. We then distinguish at the receiver two set of samples; the ones occurring at times (kT, for k=1,2,3, . . . ) and T is the symbol period (the 'even' samples); and the others occurring at time $$\left(kT + \frac{T}{2}, \text{ for } k = 1, 2, 3, \ldots\right).$$

At the odd sample points, we have a direct correlation between the differential phase (or the reciprocal sign) of consecutive pulses and the detected amplitude of the signal after the photoreceiver. This correlation is exploited at the optical transmitter to encode information bits using consecutive pulses: when consecutive pulses have the same sign, they will interfere constructively, and after the square law detector at the receiver a nonnegligible optical power will be detected; and when consecutive symbols have different signs, they will interfere destructively, and a very low amount of optical power will be detected at the receiver. An additional bit of information can thus be encoded in the differential amplitude sign of adjacent symbols, i.e. in the phase difference between consecutive pulses.

Detecting the absolute phase of a received signal requires a coherent receiver. In the optical transmission system 700, the differential phase between two time-overlapping pulses can be estimated by means of a direct detection, DD, receiver because the amplitude at the sampling time depends on the phase difference. Generating multiple phases requires a phase modulator or, for a coherent transmitter, an IQ modulator, which allows to generate arbitrary symbols in the complex plane. However, if the phase can only take the values (0, π) a Mach Zehnder Modulator can be used, as in the bipolar N-PAM used in the optical transmission system 700.

Figure 11:
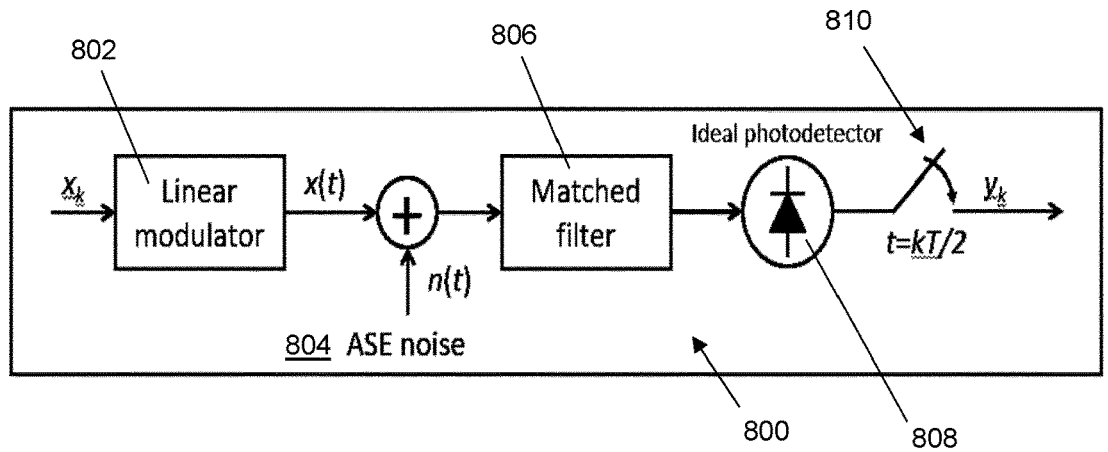
FIG. 11 is a block diagram illustrating a simulated optical transmission system according to an embodiment.

To evaluate the optical transmission system 700, a set of simulations have been performed in Matlab and a comparison with standard unipolar M-PAM and OOK modulation scheme has been made, for the optical transmission system shown in FIG. 11.

The simulation uses an additive white Gaussian noise, AWGN, channel with amplified spontaneous emission, ASE, noise, while during propagation the whole set of optical effects have been simulated. The optical pulses have a Root Raised Cosine, RRC, shape in time with a roll off factor of 0.85. This pulse shape has been specifically chosen to produce a high interference between consecutive pulses, while minimizing the interference between pulses at distance greater than one, i.e. more than one pulse away. The optical pulses may alternatively have an RRC filtered by a Bessel Thomson filter shape or a Gaussian shape in time.

The optical pulses are filtered with a matched filter and then sampled every T/2, where T is the symbol period. Simulations were also run for two alternative versions of a unipolar standard M-PAM, with amplitude levels equidistance in power or in amplitude. Simulation were then run with 4 and 8 amplitude levels. The simulation parameters are summarized in Table 1.

Figure 12:
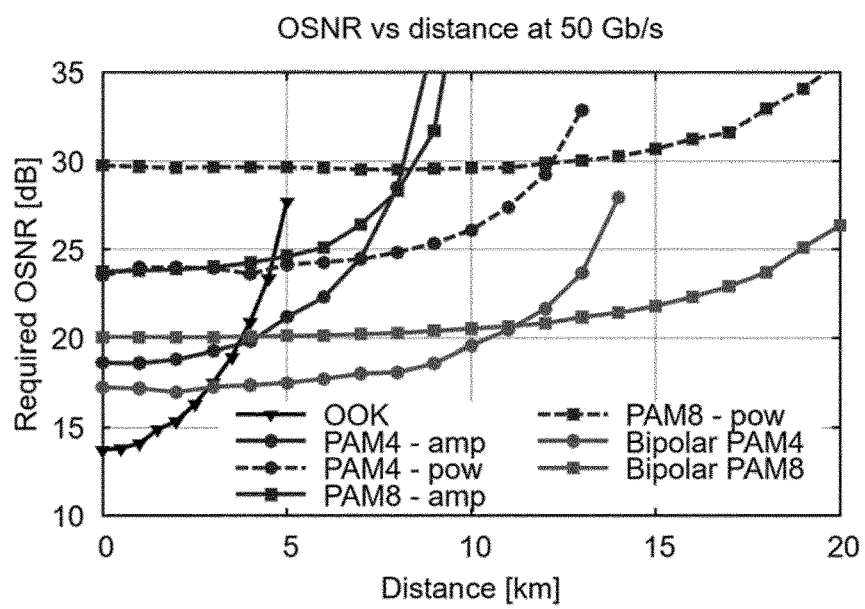
FIG. 12 is a graph of OSNR as a function of Distance at a transmission rate of 50 Gbit/s in the simulated optical transmission system of FIG. 9.
Figure 13:
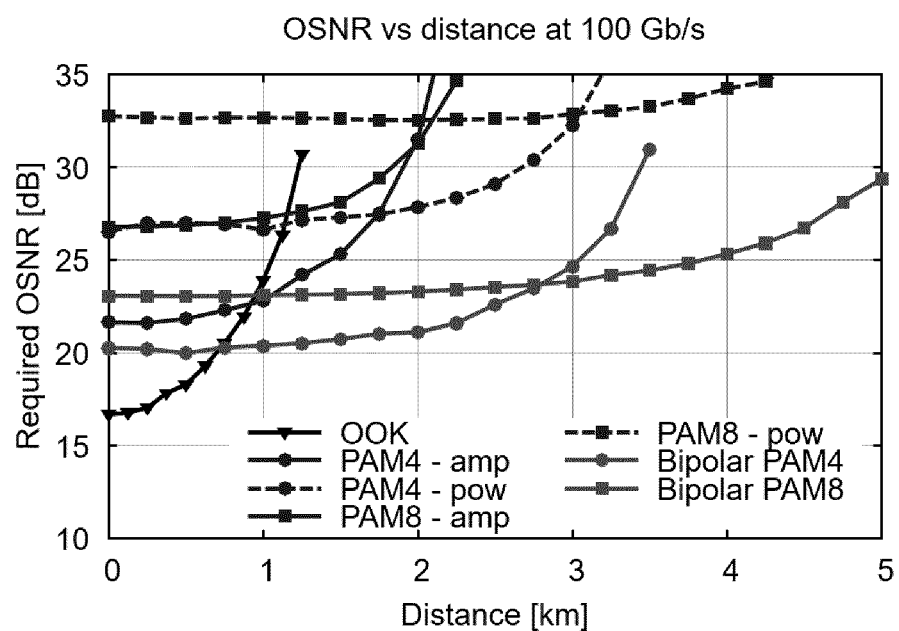
FIG. 13 is a graph of OSNR as a function of Distance at a transmission rate of 100 Gbit/s in the simulated optical transmission system of FIG. 9.

FIGS. 12 and 13 show the results of the simulations. The figures show link distance vs required optical signal to noise ratio, OSNR. With required OSNR we mean the ratio for which it is possible for the optical receiver to correctly receive a transmitted bit stream with a bit error probability of $1.1*10^{-3}$, the required threshold for the super FEC Reed-Solomon (2720,2550). In addition to the PAMs modulations, OOK is included added with same characteristic for comparison.

TABLE 1

Simulation parameters

| Parameter | Unipolar PAM | Bipolar PAM | Bipolar PAM |
|---|---|---|---|
| Bit rate | $R_b$ = 50 Gb/s or 100 Gb/s | | |
| Symbol rate | $R_s = R_b/\log_2(M)$ | | |
| PAM levels | 0, 1, 2, 3, . . . , M − 1 | 0, 1, √2, . . . , √(M − 1) | ±1, ±2, , ±M/2 |
| Pulse shape | NRZ (raised cosine in time, rolloff 0.85) | | |
| Optical filter | $4^{th}$-order Gaussian, $B_o$ = 1, $4R_s$ | | |
| Postdet. filter | Gaussian, $B_{PD} = 2R_s$ (*) | | |
| Dispersion | D = 17 ps/nm/km | | |

The simulation results show that the optical transmission system 700, 800 has a good tolerance to chromatic dispersion as compared to unipolar PAMs and as compared to OOK. In a back-to-back transmission case, the bipolar PAM has a constant gain as compared to unipolar PAM formats, while the OOK performs better. However, by increasing the distance to a few kilometers, the advantage of the optical transmission scheme of the present invention as compared to OOK also becomes evident and increases with link distance.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the above description.

The invention claimed is:

1. A method of encoding communications traffic bits onto an optical carrier signal in a pulse amplitude modulation format, the method comprising:
    receiving communications traffic bits to be transmitted;
    receiving an optical carrier signal comprising optical pulses having an amplitude and respective phases;
    performing pulse amplitude modulation of the optical pulses to encode at least one respective bit in one of a pre-set plurality of amplitudes of a said optical pulse; and
    performing phase modulation of the optical pulses to encode at least one further respective bit in a phase difference between a said optical pulse and a consecutive optical pulse.

2. The method of claim 1, comprising encoding a respective plurality of bits on a pre-set plurality, M, of amplitudes comprising positive and negative amplitudes of a plurality, M/2, of amplitude levels.

3. The method of claim 2, comprising encoding a respective plurality, m=$\log_2$ M−1, of bits on a pre-set plurality, M, of amplitudes.

4. The method of claim 1, comprising encoding a respective plurality, N−1, of bits in a phase difference between a said optical pulse and the consecutive optical pulse, wherein the optical pulses have one of a plurality, N, of phases as a result of the phase modulation.

5. The method of claim 1, wherein the optical pulses are one of Root Raised Cosine shaped pulses and Gaussian shaped pulses.

6. A method of decoding communications traffic bits carried on an optical carrier signal, the method comprising:
    receiving an optical signal comprising optical pulses having respective amplitudes and respective phases, and having a symbol period, T;
    directly detecting the optical pulses to generate a corresponding electrical received signal;
    oversampling the electrical received signal at a rate of two samples per symbol period to obtain even samples indicative of respective amplitudes of the pulses and odd samples indicative of respective phase differences between consecutive pulses; and
    decoding the even samples to obtain at least one even bit for each even sample and decoding the odd samples to obtain at least one odd bit for each odd sample, the even bits and the odd bits being interleaved according to the respective samples.

7. The method of claim 6, wherein sampling the electrical received signal comprises sampling at times, kT, corresponding to the central instants of the optical pulses to obtain the even samples and sampling at times, $$kT + \frac{T}{2},$$

corresponding to maximum interference between consecutive pulses to obtain the odd samples.

8. The method of claim 6, wherein the odd samples are indicative of corresponding amplitudes of the electrical received signal and there is a direct correlation between the amplitude of the electrical received signal and the phase difference between the respective consecutive pulses.

9. The method of claim 8, wherein the odd samples amplitudes are proportional to the square modulus of the cosine phase difference between respective consecutive pulses.

10. An optical transmitter comprising:
    an optical source configured to generate an optical carrier signal comprising optical pulses having an amplitude and respective phases;
    an optical modulator configured to receive the optical pulses and to perform pulse amplitude modulation and phase modulation on the optical pulses; and
    an encoding circuit configured to receive communications traffic bits to be transmitted and to:
        map at least one respective bit to one of a pre-set plurality of optical amplitudes;
        map at least one further respective bit to a phase difference between consecutive optical pulses; and generate and transmit a respective drive signal to the optical modulator, the optical modulator, in response to the drive signal, being configured to perform at least one of pulse amplitude modulation and phase modulation to thereby encode the bits onto respective optical pulses.

11. The optical transmitter of claim 10, wherein the encoding circuit is configured to map a respective plurality of bits to a pre-set plurality, M, of amplitudes comprising positive and negative amplitudes of a plurality, M/2, of amplitude levels.

12. The optical transmitter of claim 11, wherein the encoding circuit is configured to map a respective plurality, $m = \log_2 M - 1$, of bits on a pre-set plurality, M, of amplitudes.

13. The optical transmitter of claim 10, wherein the optical modulator is configured to phase modulate the optical pulses to have one of a plurality, N, of phases and the encoding circuit is configured to map a respective plurality, N−1, of bits in a respective phase difference between consecutive optical pulses.

14. The optical transmitter of claim 10, wherein the optical pulses are one of Root Raised Cosine shaped pulses and Gaussian shaped pulses.

15. An optical receiver comprising:
a photodetector configured to:
receive an optical signal comprising optical pulses having respective amplitudes and respective phases, and having a symbol period, T; and
directly detect the optical pulses to generate a corresponding electrical received signal;
a sampling circuit configured to oversample the electrical received signal at a rate of two samples per symbol period to obtain even samples indicative of respective amplitudes of the pulses and odd samples indicative of respective phase differences between consecutive pulses; and
a decoding circuit configured to decode the even samples to obtain at least one even bit for each even sample and decode the odd samples to obtain at least one odd bit for each odd sample, the even bits and the odd bits being interleaved according to the respective samples.

16. The optical receiver of claim 15, wherein the sampling circuit is configured to sample the electrical received signal at times, kT, corresponding to the central instants of the optical pulses to obtain the even samples and at times, $$kT + \frac{T}{2},$$

corresponding to maximum interference between consecutive pulses to obtain the odd samples.

17. The optical receiver of claim 15, wherein the odd samples are indicative of corresponding amplitudes of the electrical received signal and there is a direct correlation between the amplitude of the electrical received signal and the phase difference between the respective consecutive pulses.

18. The optical receiver of claim 17, wherein the odd samples' amplitudes are proportional to the square modulus of the cosine phase difference between respective consecutive pulses.

* * * * *